United States Patent [19]

Carter et al.

[11] 4,100,379

[45] Jul. 11, 1978

[54] COMMUNICATION UNITS

[75] Inventors: David Carter; Malcolm Withnall; Alan Williams; Digby Ralph Redshaw, all of Warwick; Richard William Stevens, Surrey, all of Great Britain

[73] Assignee: The Post Office, London, England

[21] Appl. No.: 766,366

[22] Filed: Feb. 7, 1977

[30] Foreign Application Priority Data

Feb. 11, 1976 [GB] United Kingdom ............... 5438/76

[51] Int. Cl.² ............................................. H04M 1/11
[52] U.S. Cl. ............................................. 179/147 R
[58] Field of Search ................. 179/147, 179; 248/25, 248/500, 507, 508; 403/110, 345, 376, 380; 325/111, 117, 119, 355

[56] References Cited

U.S. PATENT DOCUMENTS

| 3,894,607 | 7/1975 | Brock ............................... 248/503 X |
| 3,940,666 | 2/1976 | Chesney et al. ................. 325/355 X |

FOREIGN PATENT DOCUMENTS 2,530,151  1/1977  Fed. Rep. of Germany ... 179/146 R

Primary Examiner—William C. Cooper
Attorney, Agent, or Firm—Kemon & Estabrook

[57] ABSTRACT

The invention is concerned with the interconnection of communications units such as telephones, microphones and loudspeakers. According to the invention a connecting plate extends between the undersurfaces of adjacent units and locates the units in the desired spatial relationship. Jointing means then detachably connect the unit to the plate.

4 Claims, 4 Drawing Figures

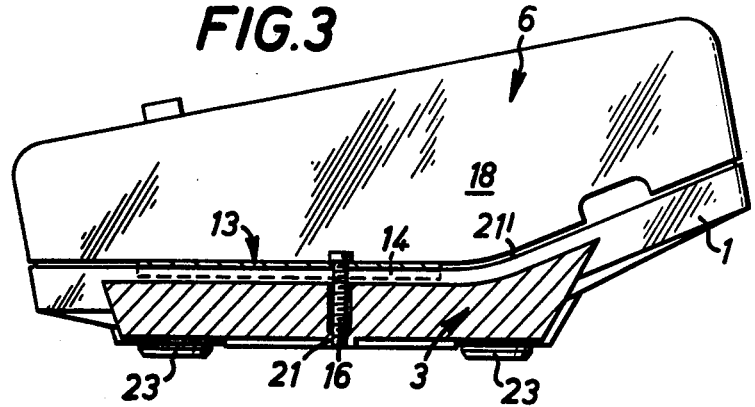
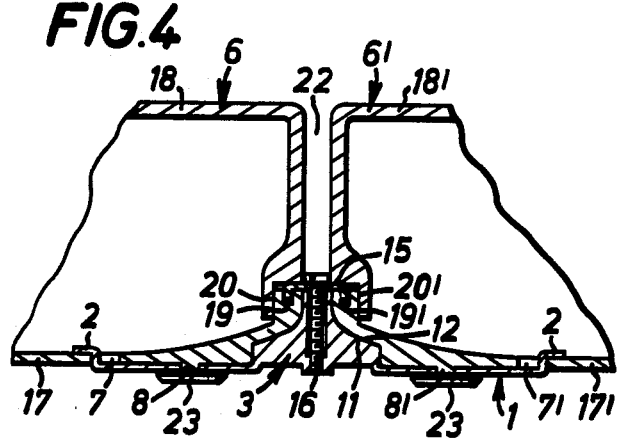

COMMUNICATION UNITS

This invention relates to modular communications units and to the mounting of such units on a horizontal surface such as a desk or table, or a vertical surface such as a wall. The phrase "communications unit" covers any device or instrument which is concerned with the transmission or receival of spoken or coded information. Examples of communications units are telephones, microphones, loudspeakers and transmitters and receivers of digital information.

According to the present invention means are provided for detachably securing together adjacent communication units in a predetermined side-by-side relationship. These means preferably comprise a plate or equivalent element extending between the undersurfaces of adjacent units. The plate is detachably secured to each unit.

Thus more specifically the present invention provides a jointing assembly for juxtaposed communications units, such assembly comprising a base element adapted to extend beneath the said units, locating parts on the base element for engagement with complementary parts on the undersurfaces of the units thereby locating the unit in a predetermined side-by-side relationship and means for fixing the assembly to the units.

The predetermined side-by-side relationship will usually be lateral alignment with front and rear margins in register.

Preferably the assembly includes a spacer against which adjacent side surfaces of juxtaposed units abut. The abutment surfaces of the spacer will be profiled for a snug and secure fit with these side surfaces. A bridging member, conveniently a channel clip, engages adjacent units and is fixed to the spacer thereby completing the joint between adjacent units.

A particular embodiment of the invention will now be described by way of example and with reference to the accompanying drawings wherein:

FIG. 3 is a section on the line 3 — 3 of FIG. 2; and

FIG. 4 is a section on the line 4 — 4 of FIG. 2.

Figure 1:
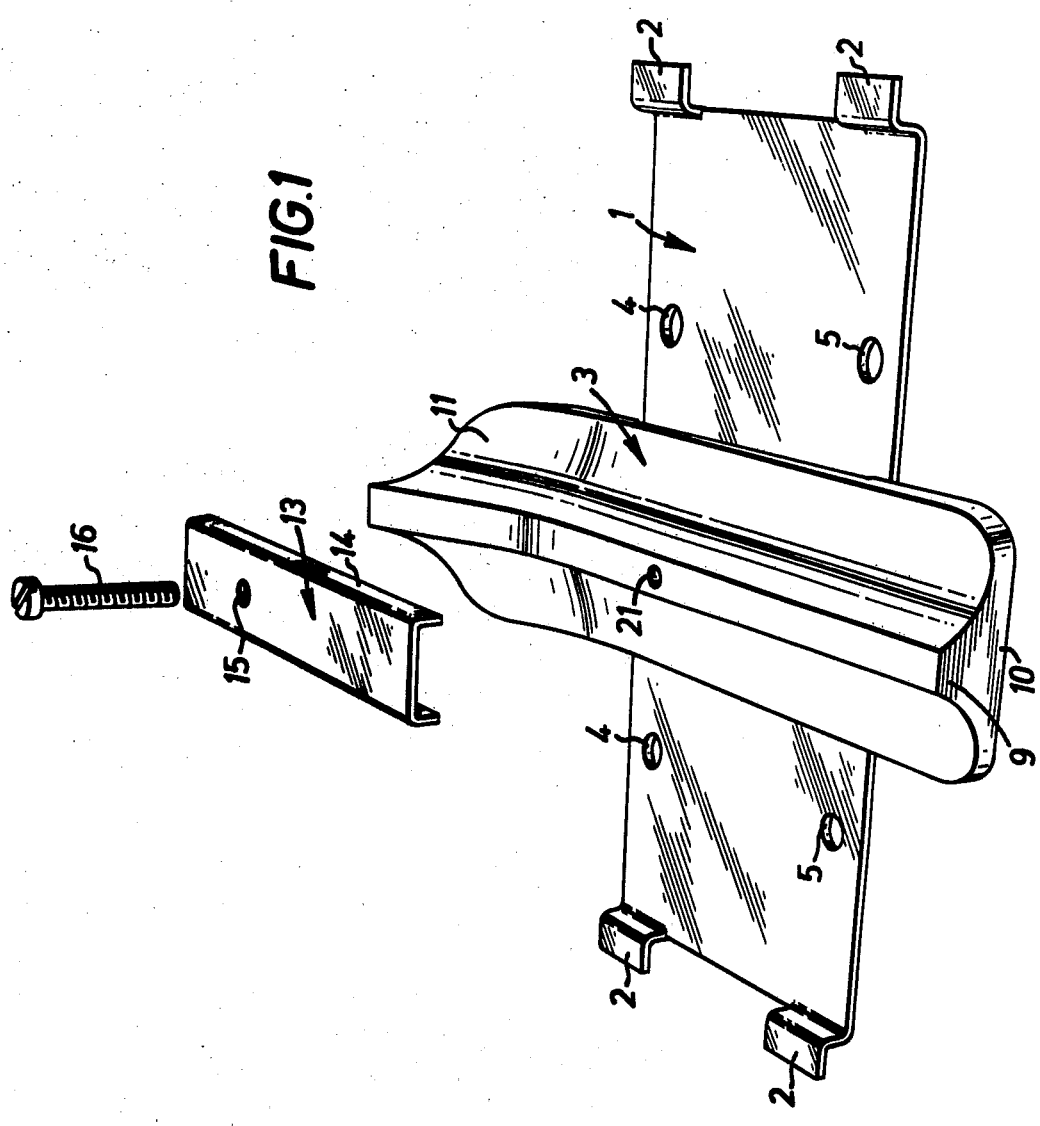
FIG. 1 is a perspective view, on an enlarged scale, of a jointing assembly in accordance with the invention.

Referring initially to FIG. 1 of the drawings the jointing assembly shown comprises a laterally elongate rectangular plate 1. The plate has tangs 2 at each corner, each tang being of angled form extending upwardly and laterally outwardly from the plate 1. A spacer 3 bisects the plate 1, projecting forwardly and rearwardly from each long edge of the latter. A front hole 4 and a rear hole 5 for receiving locating pips on the undersurface of a communications unit is provided on either side of the spacer 3. The underneath configuration of the jointing assembly is well seen in FIG. 4.

The undersurface of adjacent communications units 6 and 6' have slots 7 and 7' receiving tangs 2 and shallow projections or pips 8, 8' which enter through holes 4 and 5 in plate 1. Spacer 3 has a base part 10 of generally rectangular cross section and an upper part 9 of pyrimidal form having concave outer surfaces 11 which are shaped to mate with complementary portions 12 of adjacent communications units (see FIG. 4). A bridging clip 13 of channel section has the flanges 14 thereof dependent and a hole 15 in the web through which a fixing screw 16 passes.

As can well be seen in FIG. 4 each communications unit 6, 6' has a lower part 17, 17' having the curved part 12, 12' and a cover 18, 18'. The undersurface of each lower part 17, 17' is flat and has in addition to the slots 7, 7' four feet 23. In the upper surface of the rim of each lower part an elongate groove 19, 19' is formed to receive flanges 14 of the bridging part 13. The cover 18, 18' has a rebate 20, 20' to receive the rim of the lower part and when the cover is fitted a gap 21 (see FIG. 3) is left to accommodate the web of bridging piece 13. The screw 16 passes through hole 15 into a threaded socket 21 in spacer element 3 thereby completing the connection of adjacent communications units.

Figure 2:
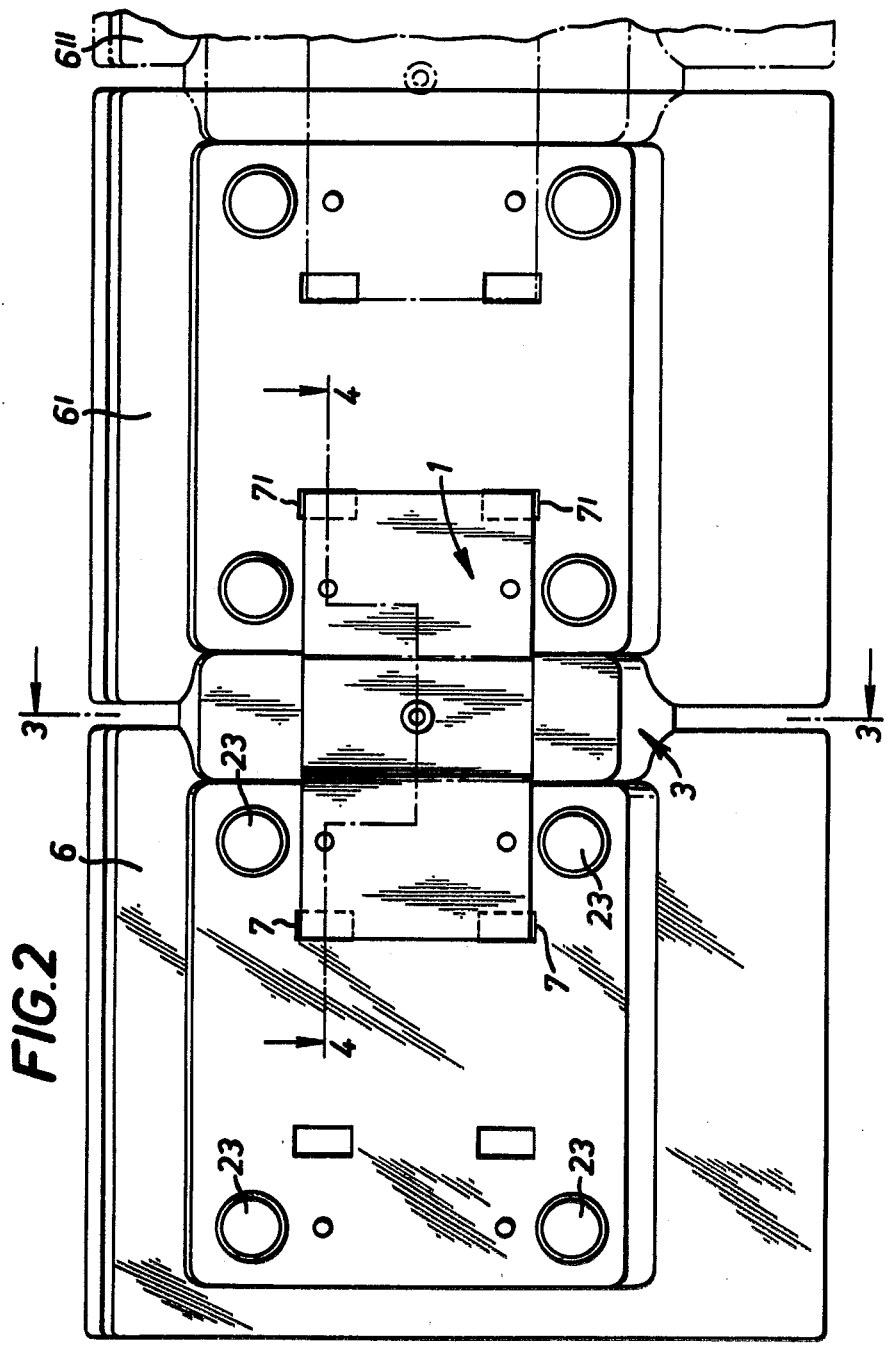
FIG. 2 is an underneath view of the assembly of FIG. 1 being used to join adjacent communication units.

Thus, in summary and referring particularly to FIG. 2, communications units 6, 6' are placed side-by-side with covers 18, 18' removed and spacer 3 of the jointing assembly interposed. The plate 1 extends between adjacent pairs of slots 7, 7' engaged by tangs 2 and the pips 8 on units 6, 6' engage holes 4 and 5 thereby firmly locating the units 6, 6' against movement relative to one another. Clip 13 is placed in position with flanges 14 in grooves 19, 19' and the screw 16 engaged through hole 15 with socket 21. The covers 18, 18' are then refitted. It will be noted from FIG. 4 that the gap 22 between adjacent units, normally masked by a thin strip (not shown), permits entry of a screwdriver so that the screw is accessible.

Part of a third unit 6" is shown in dot and dash lines. Unit 6" is connected to unit 6' in the manner described with reference to units 6 and 6'. As will be seen the units are in lateral alignment with front and rear margins in register.

The communications units 6, 6' are shown diagrammatically and can be any of the devices or instruments mentioned previously.

We claim:

1. A jointing assembly for juxtaposed communication units, such assembly comprising a base element adapted to extend beneath said units, locating parts on the base element for engagement with complimentary parts on the undersurface of the units thereby locating the units in a predetermined side-by-side relationship and means for fixing the assembly to the units and a spacer element attached to the base element against which adjacent side surfaces of juxtaposed units abut.

2. An assembly as claimed in claim 1 wherein the said locating and complementary parts are a shallow projection and a mating socket.

3. An assembly as claimed in claim 1 wherein the said fixing means comprise a bridging member fixed to the spacer and having parts engaging and fixing together.

4. An assembly as claimed in claim 3 wherein the bridging member is a channel-shaped clip, which in use has the flanges dependent, one flange engaging a slot on one unit, the other flange engaging a slot in the other unit and the web secured to the spacer elements.

* * * * *